W. A. ZEISER & G. B. PICKOP.
DRIVING MECHANISM FOR MULTIPLE SPINDLE SCREW MACHINES.
APPLICATION FILED AUG. 5, 1912.
1,053,465.
Patented Feb. 18, 1913.
2 SHEETS—SHEET 1.
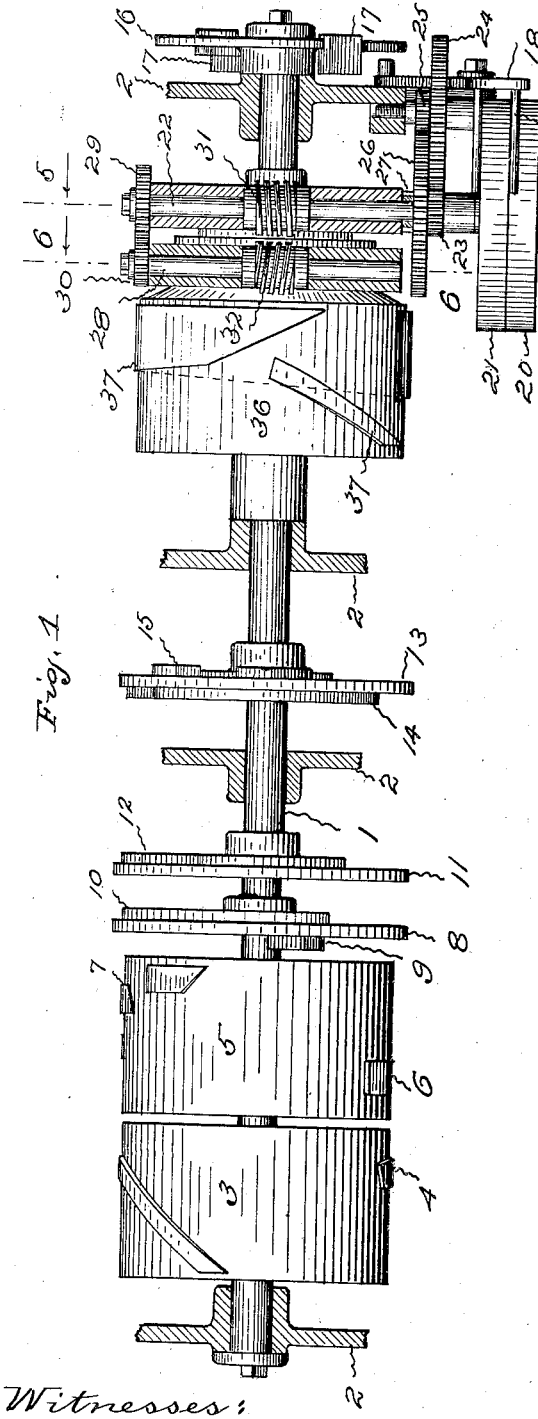
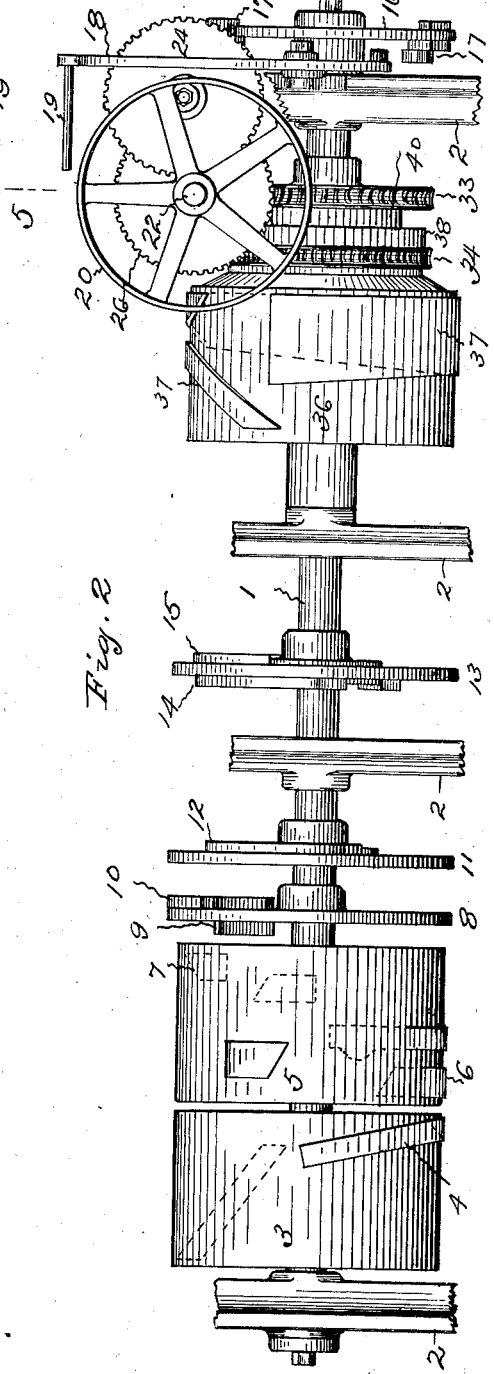

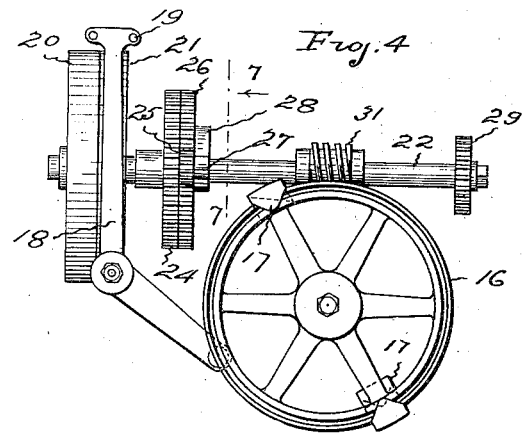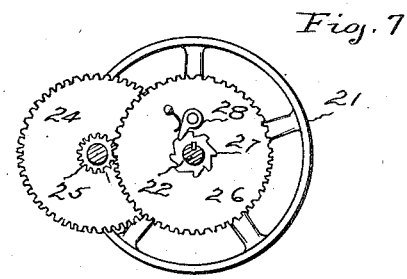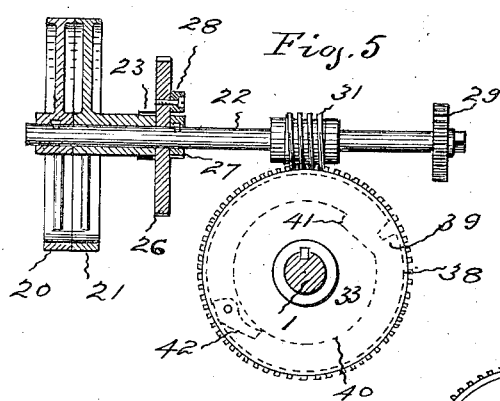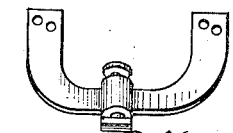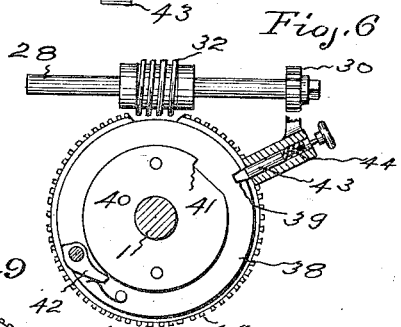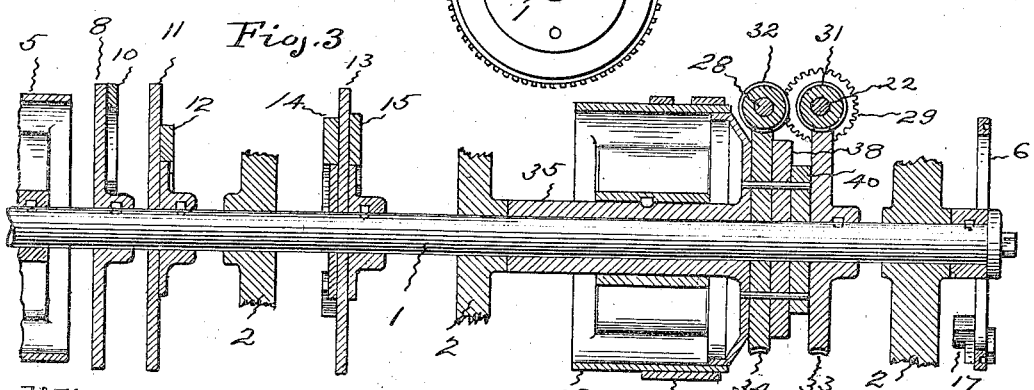

UNITED STATES PATENT OFFICE.

WILLIAM A. ZEISER AND GEORGE B. PICKOP, OF HARTFORD, CONNECTICUT, ASSIGNORS TO THE UNIVERSAL MACHINE SCREW COMPANY, OF HARTFORD, CONNECTICUT, A CORPORATION OF CONNECTICUT.

DRIVING MECHANISM FOR MULTIPLE-SPINDLE SCREW-MACHINES.

1,053,465.           Specification of Letters Patent.     Patented Feb. 18, 1913.

Application filed August 5, 1912. Serial No. 713,331.

*To all whom it may concern:*

Be it known that we, WILLIAM A. ZEISER and GEORGE B. PICKOP, citizens of the United States, residing at Hartford, in the county of Hartford and State of Connecticut, have invented a new and useful Improvement in Driving Mechanism for Multiple-Spindle Screw-Machines, of which the following is a specification.
This invention relates to the driving mechanism of an automatic multiple spindle screw machine of the type which is constructed to intermittently feed continuous lengths of rods through rotatory and revoluble spindles, to the tools which perform the desired operations.

The mechanism herein illustrated and described is designed to drive such a machine as is set forth in U. S. Patent No. 816,510 of March 27, 1906. In machines of this character the rods are automatically fed intermittently through spindles which are provided with chucks that at the proper times are opened to permit the feed of the rods and closed to grip the rods. The spindles are rotated in one direction while the ends of the rods are being shaped and are rotated oppositely whenever threads are cut on the rods. The head which carries the spindles is rotatably mounted and at intervals is unlocked and given a partial rotation for carrying the rods from tool to tool, the head being locked while the tools are cutting. The end tools, or those which move longitudinally of the rods, are advanced to the rods for cutting and retracted from the rods to permit indexing, while the spindle head is stationary, such distances and at such speeds as is necessitated by the character of the work which is to be performed, and the spindle head is given its rotatory indexing movements for carrying the rods successively into line with the several tools after those tools have been drawn back and are at rest.

The object of this invention is to construct the driving mechanism for a machine of this character in such a manner that the spindle head will be indexed very rapidly, thus saving time and increasing the efficiency of the machine, at a time when the tool slides are stationary in their retracted positions and their cams are performing no operations, thus so distributing the work of the cam shaft that the force required to drive the machine will be equalized, insuring steadier operation with less maximum power. This object is attained by so arranging the driving mechanism that the feeding, chucking, indexing, unlocking and speed changing cams are all connected to the cam shaft and consequently are all driven at the same speed, while the cams that operate the tool slide are independently mounted on the cam shaft and are at one time driven at a faster speed, at another time are driven at the same speed as the main cam shaft, and at the time that the spindle head is indexed are at rest. This independent variable movement of the tool slide cams also permits the employment of longer and consequently less steep cams, a factor which reduces the side thrust and wear and insures a smoother movement and closer adjustment of the tools than is possible with the driving mechanism of the prior machines of this class.

Figure 1 of the accompanying drawings shows a plan of a driving mechanism which embodies this invention. The stock feeding and chucking, the spindle head indexing and unlocking, and the tool carrying parts and mechanisms are not illustrated and described herein as they form no part of the present invention, are well known to those skilled in the art, and are fully set forth in the patent above referred to. Fig. 2 shows a side elevation of the same driving mechanism. Fig. 3 shows a vertical longitudinal section of the driving mechanism. Fig. 4 shows an elevation looking at the right hand end of the driving mechanism. Fig. 5 is a transverse vertical section on the plane indicated by the dotted line 5—5 on Fig. 1. Fig. 6 is a similar section on the plane indicated by the dotted line 6—6 on Fig. 1. Fig. 7 is a section on the plane indicated by the dotted line 7—7 on Fig. 4. Fig. 8 shows a view of the yoke and tool cam drum locking bolt shown in Fig. 6. Fig. 9 shows a side view of the worm wheel which rotates the tool slide cams and illustrates the way in which the driving pawl lifts the locking bolt out of the notch for releasing the tool slide cam drum.

The cam shaft 1, is supported at various localities by bearings in parts 2 of the machine frame. Fastened to the shaft near one end is a drum 3 with the rod feeding cams 4. Fastened adjacent to the feeding cam drum is the drum 5 with the cams 6 which effect the chucking and the cams 7 which effect the reversing of the spindles. The disk 8 that is fastened to the shaft carries the spindle head indexing cams 9 and spindle head unlocking cams 10. The disk 11 fastened to the shaft bears cams 12 for operating a cutting-off or forming tool, and the disk 13 fastened to the shaft bears the cams 14 and 15, which are utilized for moving the cross slides which carry cutting and forming tools. Keyed to the other end of the shaft is a wheel 16 bearing dogs 17, which are arranged to operate the shipper that moves the driving belt from one pulley to another for varying the speed of the cam shaft.

The belt shifting lever 18 has a fork 19 for sliding the belt at the proper times according to the location of the dogs 17 on the wheel 16, back and forth from the pulley 20 to the pulley 21. The pulley 20 is keyed directly to the transverse shaft 22. The pulley 21 is loose on the shaft 22. On the hub of the pulley 21 is a pinion 23 which meshes with a gear 24 that has a pinion 25 which meshes with a gear 26 that is also loose on the shaft 22. Keyed to the shaft 22 adjacent to the gear 26 is a ratchet wheel 27, and engaging the teeth of this ratchet wheel is a pawl 28 that is mounted on the gear 26. When the belt is on the pulley 20, the shaft 22 is rotated directly at full speed. When the belt is shifted to the pulley 21, the shaft 22 is driven by the pinions, gears, pawl and ratchet at lower speed. The times of these changes of speed may be varied by altering the location of the shifter lever dogs 17 on the wheel 16 that is keyed to the cam shaft.

Parallel with the shaft 22 is a shaft 28. On the shaft 22 is a gear 29 that meshes with a pinion 30 on the shaft 28. The gear and pinion are so designed that the shaft 28 will run much faster than the shaft 22. In the machine constructed according to this invention, the ratio is two to one. On the shaft 22 is a worm 31, and on the shaft 28 is a worm 32. The worm 31 engages a worm wheel 33 that is keyed to the cam shaft. The worm 32 engages a worm wheel 34 that is loose on the cam shaft. In order that these worm wheels shall be rotated in the same direction by the geared shafts 22 and 28, one of the worms is right handed and the other is left handed. The worm wheel 34 is fastened to a sleeve 35 that is also loose on the cam shaft. Mounted on and fastened to this loose sleeve is a drum 36 which bears the cams 37 that are designed to move back and forth the slide which carries the end tools. Secured to one side of the worm wheel 34 is a disk 38 with a locking notch 39, and at the side of the disk and fastened thereto is a ratchet plate 40 with a tooth 41. Fastened to the side of the worm wheel 33 is a pawl 42 that is adapted to engage the tooth 41 in the ratchet plate 40. Movable radially of the disk 38 and plate 40 is a bolt 43 which is held by a yoke (Fig. 8) attached to the frame of the machine, and is normally thrust inward by a spring 44. At one locality some of the teeth of the worm wheel 34 are cut away, and when this mutilated portion is opposite the worm 32, the bolt 43 is thrust by its spring into the locking notch 39 in the disk 38 so as to hold the locking disk 38, ratchet plate 40, worm wheel 34, sleeve 35, and tool slide cam drum 36 stationary. When the pawl 42 that is carried by the worm wheel 33 reaches the tooth 41 in the plate 40, the back of the pawl engages the projecting end of the bolt 43 and lifts it from the locking notch 39 so that the parts which were locked become free to be moved by the pawl, the continued movement of which carries the worm wheel 34 around until its teeth are again engaged by the worm 32.

With the construction shown, the shaft 28 always rotates twice as fast as the shaft 22, and consequently the worm 32 drives the worm wheel 34 twice as fast as the worm 31 drives the worm wheel 33, except of course when the worm wheel 34 reaches the position in which its teeth are out of engagement with the worm 32, at which time the worm wheel and the attached cam drum are held against rotation by the lock bolt 43. When the worm 32 is engaged with the worm wheel 34, the tool slide cam drum 36 is rotated rapidly, and as the worm wheel 34 moves twice as fast as the worm wheel 33, the tooth of the ratchet plate 40 moves away from the end of the pawl 42 that is carried by the worm wheel 33 until the worm wheel 34 becomes disengaged from the worm 32 and the cam drum 36 stops. The revolution of the cam shaft, however, is continued through the worm wheel 33 so as to rotate the feeding and chucking cam drums and the indexing, unlocking and cross slide cam disks. At this time, however, the belt is shifted onto the fixed pulley 20 so as to drive the cam shaft at high speed and thus cause the spindle head to be quickly unlocked and indexed. After this has been accomplished, the continued movement of the worm wheel 33 carries the pawl around into engagement with the tooth and lifts the locking bolt so that the continued movement of the pawl with the worm wheel 33 will carry the worm wheel 34 with it at the same speed until its teeth are engaged by the worm 32, and then the worm wheel 34 again runs ahead of the worm wheel 33. With this mechanism, the cam drum which advances and retracts the end tools is rotated rapidly during the time the tools are being advanced to the work and withdrawn therefrom, and is stopped absolutely still while the spindle head is being indexed. In view of the fact that the tool cams are driven by independent means at a rate of speed greater than that of the other cams, it is unnecessary to impart a fast and slow movement to the tool cams, and as a result of this speed the cams can be longer and less steep without sacrificing time in running the machine. The drum with the cams which operate the tool slide is always stationary and is doing no work when the spindle head is indexed, and as the operations are effected at different periods the machine can be run with but little power.

The invention claimed is:

1. A driving mechanism for a multiple spindle screw machine having a cam shaft, mechanism for rotating the cam shaft, feeding, chucking and indexing cams borne by and fastened to the cam shaft, tool feeding cams borne by and loose on the cam shaft, and means operated by said cam shaft rotating mechanism for intermittently rotating the tool feeding cams.

2. A driving mechanism for a multiple spindle screw machine having a cam shaft, variable speed mechanism for rotating the cam shaft, feeding, chucking and indexing cams borne by and fastened to the cam shaft, tool feeding cams borne by and loose on the cam shaft, and means operated by said cam shaft rotating mechanism for intermittently rotating the tool feeding cams.

3. A driving mechanism for a multiple spindle screw machine having a cam shaft, variable speed mechanism for rotating the cam shaft, feeding, chucking and indexing cams borne by and fastened to the cam shaft, tool feeding cams borne by and loose on the cam shaft, and mechanism for rotating the tool feeding cams at intervals at a faster rate than the speed of the feeding, chucking and indexing cams, and at intervals at the same rate of speed.

4. A driving mechanism for a multiple spindle screw machine having a cam shaft, mechanism for rotating the cam shaft, indexing cams borne by and fastened to the cam shaft, tool feeding cams borne by and loose on the cam shaft, and means operated by said cam shaft rotating mechanism for intermittently rotating the tool feeding cams.

5. A driving mechanism for a multiple spindle screw machine having a cam shaft, variable speed mechanism for rotating the cam shaft, indexing cams borne by and fastened to the cam shaft, tool feeding cams borne by and loose on the cam shaft, means operated by said cam shaft rotating means for intermittently rotating the tool feeding cams, and means whereby said tool feeding cams remain stationary while the indexing cams are operating.

6. A driving mechanism for a multiple spindle screw machine having a cam shaft, feeding, chucking and indexing cams borne by and fastened to the cam shaft, tool feeding cams borne by and loose on the cam shaft, mechanism for rotating the cam shaft at two rates of speed, mechanism for intermittently rotating the tool feeding cams at a faster rate of speed than the feeding, chucking and indexing cams, and means for intermittently disconnecting the mechanism for rotating the tool feeding cams and allowing them to remain stationary.

7. A driving mechanism for a multiple spindle screw machine having a cam shaft, indexing cams borne by and fastened to the cam shaft, tool feeding cams borne by and loose on the cam shaft, mechanism for rotating the cam shaft, mechanism intermittently connected with the mechanism for rotating the cam shaft for rotating the tool feeding cams, and mechanism for driving the cam shaft rotating mechanism at a faster rate of speed when the mechanism for rotating the tool feeding cams is out of engagement and the tool feeding cams are stationary.

8. A driving mechanism for a multiple spindle screw machine having a cam shaft, feeding, chucking, indexing and belt shifting cams borne by and fastened to the cam shaft, tool feeding cams borne by and loose on the cam shaft, mechanism for rotating the cam shaft at different speeds, and mechanism for rotating the tool feeding cams at one time faster and at another time slower than the feeding, chucking, indexing and shifting cams.

9. A driving mechanism for a multiple spindle screw machine having stock indexing cams and tool feeding cams, said cams being independently rotatable, driving mechanism for rotating the cams, means connecting the driving mechanism and the indexing cams all the time, and means connecting the driving mechanism and the feeding cams intermittently.

10. A driving mechanism for a multiple spindle screw machine having stock indexing cams and tool feeding cams, said cams being independently rotatable, variable speed driving mechanism for rotating the cams, means connecting the driving mechanism and the indexing cams all the time, and means connecting the driving mechanism and the feeding cams when the driving mechanism is operated at slow speed.

11. A driving mechanism for a multiple spindle screw machine having stock indexing cams and tool feeding cams, said cams being independently rotatable, means for rotating the indexing cams continuously, means for rotating the feeding cams intermittently, the latter means being driven by the former means, and means for connecting the index rotating means with the feed cams when the first mentioned feed cam rotating means is running idle.

12. A driving mechanism for a multiple spindle screw machine having a cam shaft, indexing cams borne by and fastened to the cam shaft, tool feeding cams borne by and loose on the cam shaft, a worm and a worm wheel for rotating the cam shaft, a worm and worm wheel for intermittently rotating the tool feeding cams, and means which intermittently connect the worm wheels and cause one to drive the other.

13. A driving mechanism for a multiple spindle screw machine having a cam shaft, indexing cams borne by and fastened to the cam shaft, tool feeding cams borne by and loose on the cam shaft, a worm and worm wheel for rotating the cam shaft, a worm and worm wheel for intermittently rotating the tool feeding cams, said worms being geared together so that one rotates faster than the other, and mechanism for intermittently connecting one worm wheel with the other so that they will rotate together.

14. A driving mechanism for a multiple spindle screw machine having a cam shaft, feeding, chucking and indexing cams borne by and fastened to the cam shaft, tool feeding cams borne by and loose on the cam shaft, a worm and worm wheel for driving the cam shaft, mechanism for varying the speed of said worm, a worm and worm wheel for rotating the tool feeding cams, said worms being geared together, and the latter being designed to rotate faster than the former, and means for intermittently connecting the worm wheels so that one will be driven by the other.

15. A driving mechanism for a multiple spindle screw machine having a cam shaft, feeding, chucking and indexing cams borne by and fastened to the cam shaft, tool feeding cams borne by and loose on the cam shaft, a worm and worm wheel for rotating the cam shaft continuously, variable speed mechanism for changing the rate of rotation of the worm and worm wheel, a worm and worm wheel for intermittently rotating the tool feeding cams, said latter worm wheel having a part of its teeth omitted so that at intervals the worm is disengaged from the worm wheel, and mechanism for connecting the first mentioned worm wheel with the last mentioned worm wheel when the last mentioned worm wheel is disengaged from its driving worm.

WILLIAM A. ZEISER.
GEORGE B. PICKOP.

Witnesses:
A. R. WILLIAMS,
JOSEPHINE M. STREMPFER.